April 5, 1955   J. R. URSCHEL   2,705,516
STEM SNIPPING KNIFE MECHANISM
Filed Dec. 4, 1953   5 Sheets-Sheet 1
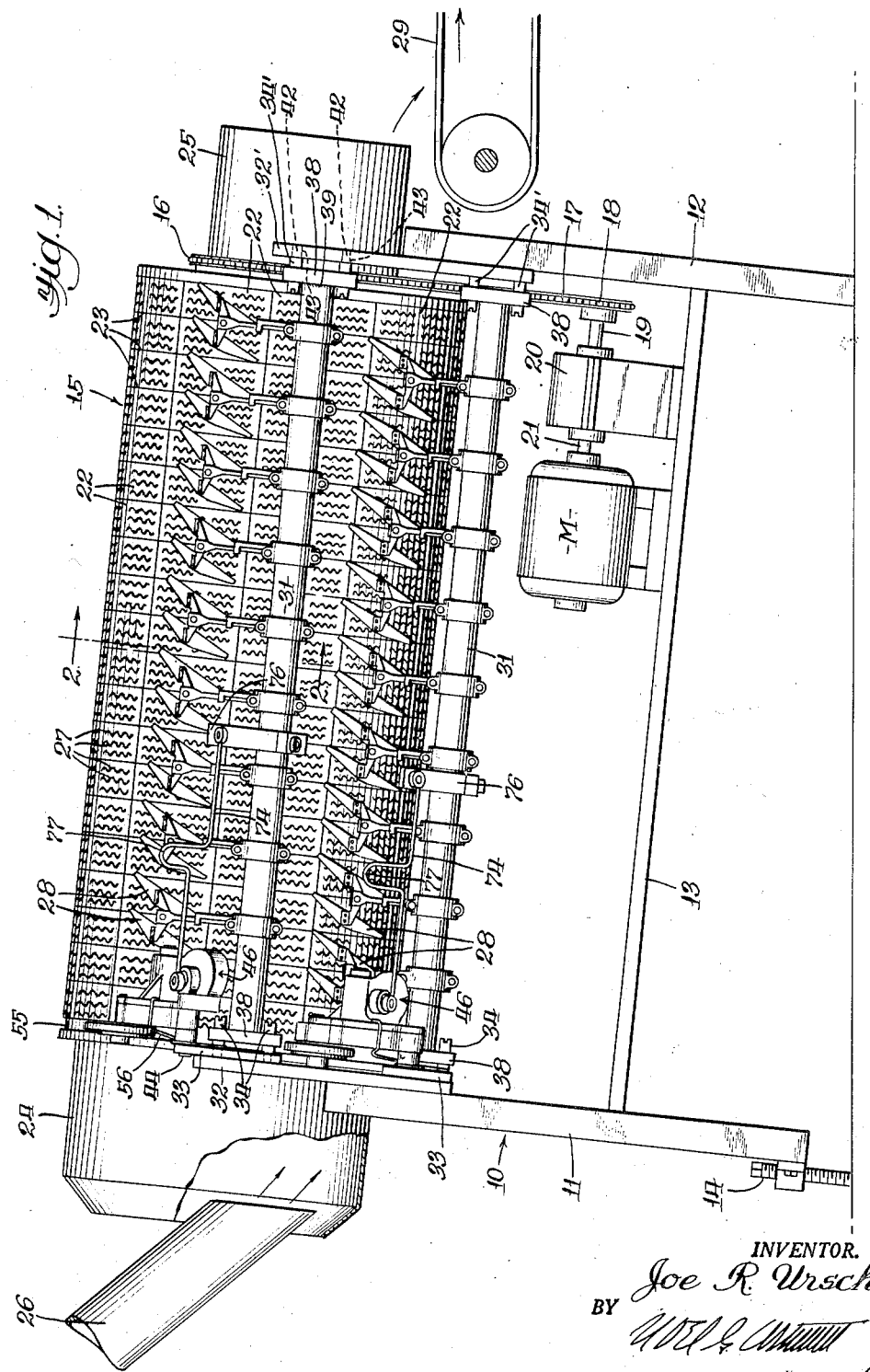
INVENTOR.
Joe R. Urschel
BY

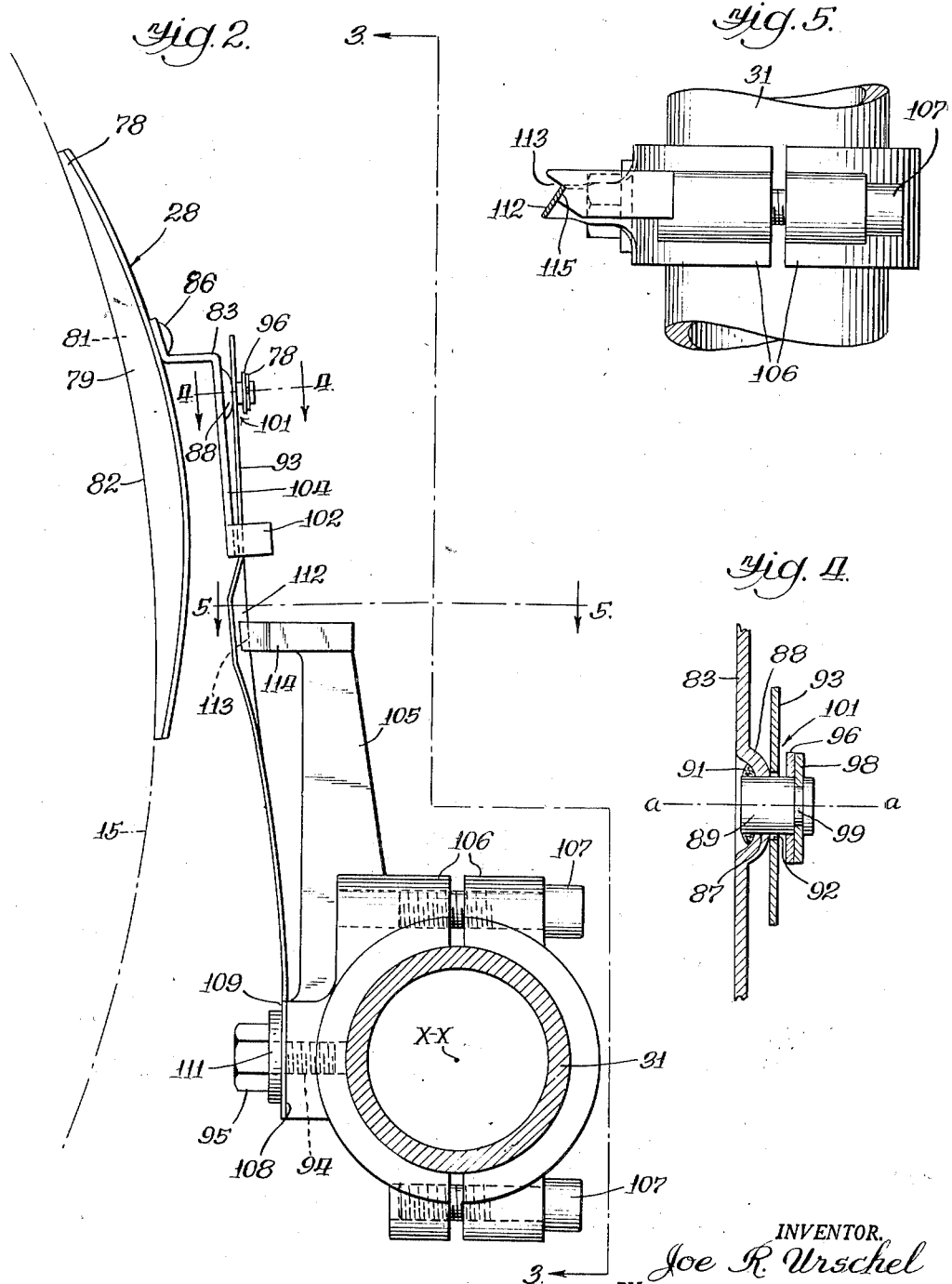

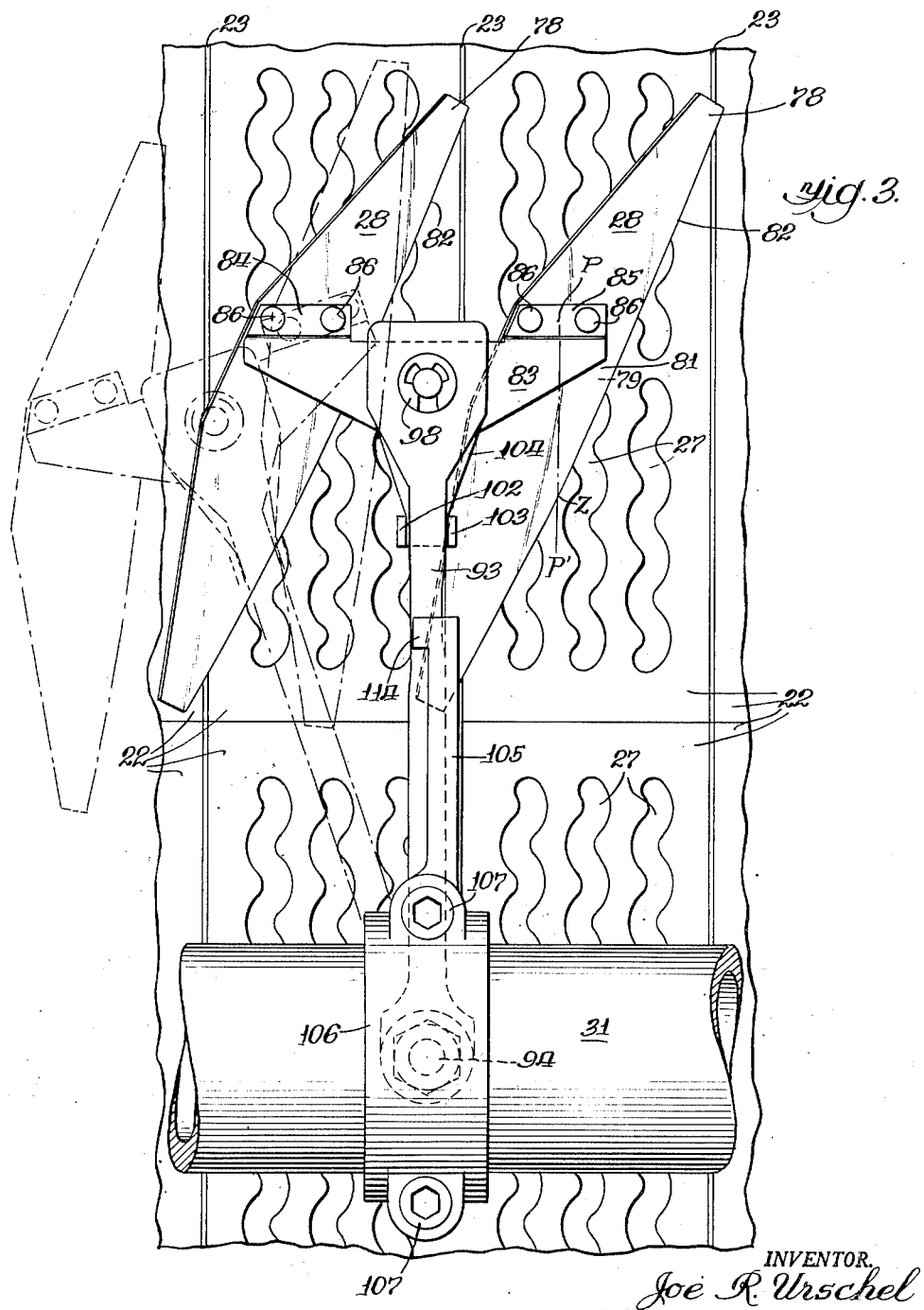

April 5, 1955   J. R. URSCHEL   2,705,516
STEM SNIPPING KNIFE MECHANISM
Filed Dec. 4, 1953   5 Sheets-Sheet 4

INVENTOR.
Joe R. Urschel
BY
Atty.

April 5, 1955
J. R. URSCHEL
2,705,516
STEM SNIPPING KNIFE MECHANISM
Filed Dec. 4, 1953
5 Sheets-Sheet 5
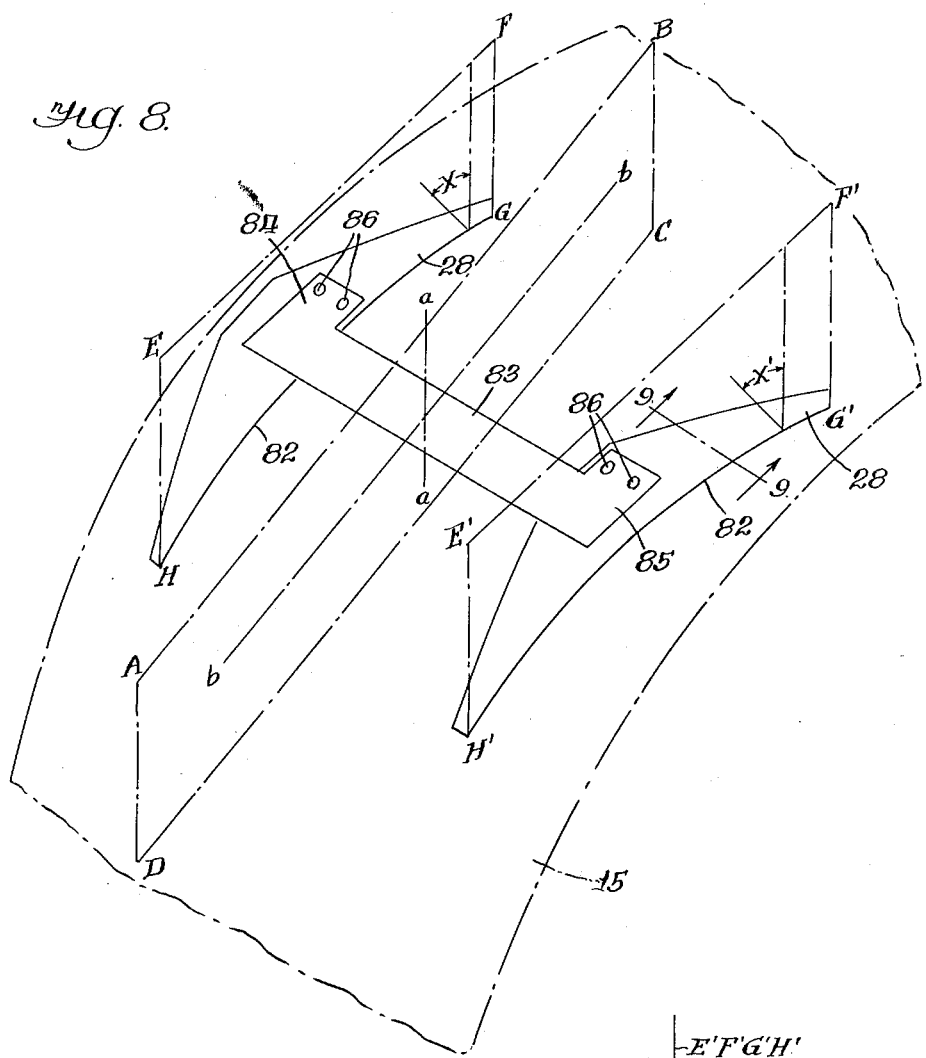
Fig. 8.
Fig. 9.
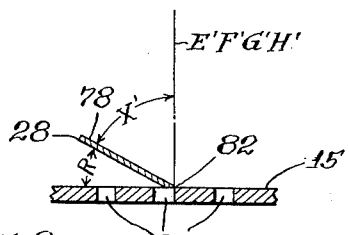
INVENTOR.
Joe R. Urschel
BY
Atty.

United States Patent Office 2,705,516
Patented Apr. 5, 1955

2,705,516

STEM SNIPPING KNIFE MECHANISM

Joe R. Urschel, Valparaiso, Ind.

Application December 4, 1953, Serial No. 396,217

14 Claims. (Cl. 146—86)

This invention has to do with knife mechanism for snipping the ends from elongated products such as string beans while end portions thereof to be snipped off project outwardly through openings therefor in the cylindrical wall of a rotating cylinder, and more particularly concerns means for holding snipping knives while maintaining cutting edges thereof in a desired oriented sliding engagement with the exterior periphery of the rotating cylinder. The invention constitutes an improvement over snipping knife mechanism disclosed in my Patent No. 2,114,730 issued April 19, 1938, for Bean Snipper.

The knives, utilized in the present invention, as in prior mechanism employed for the same purpose, have opposite broad faces and are bowed lengthwise to place a concave curvature in an inner of such faces and a convex curvature in the outer of such faces. A cutting edge is formed coincidently with one of the long curved edges of each bowed knife. Said knives are tilted at a rake angle with respect to the exterior surface of the cylinder while their cutting edges slidingly engage and extend spirally of such surface. The knives of prior machines have been individually supported by means connected with an intermediate section of their bowed bodies. A disadvantage of supporting the knives in this manner has been that when a knife edge encountered an inordinately tough bean or foreign object projecting outwardly through an opening in the cylinder, the greater force thus imparted to the knife would twist it to cause the cutting edge to dig into the rotating cylindrical surface, thereby injuring such surface and also the knife.

One attempt to overcome this disadvantage of the individually supported knives has involved the use of a knife structure having a V-shaped edge with the point of the V facing oppositely to the direction of movement of the cylinder surface in contact therewith. This approach has not been satisfactory, however, because the cylinder is made up of a plurality of fabricated parts which collectively form an exterior surface that is not perfectly cylindrical, wherefor all portions of the V edge of the knife do not simultaneously contact such surface. The knife structure with the V edge inherently possesses sufficient resistance to bending or flexing that too much pressure would have to be applied thereto to cause the V edge to conform throughout its length to the irregularities in the substantially cylindrical surface. Any portion of the knife edge failing to slide in contact with the cylinder surface does not properly cooperate with the cylinder for snipping the beans.

An important object of this invention is the provision of an improved snipping knife mechanism wherein the knives are supported in pairs, the knives of said pairs being mounted upon opposite ends of a yoke which has pressure applied to an intermediate portion thereof by means of a universal pivot connection therewith for transmitting this pressure evenly to the knives of which the cutting edges are thus pressed slidingly into conformity with the rotating cylindrical surface. The yoke and the knives constitute a sort of floating frame which braces each knife against the other to resist either knife twisting when encountering an object that is non-snippable or difficult to snip.

A further object is the provision of bowed flexible knives of which the curvature in the cutting edges is at a slightly shorter radius than the radius of curvature of the cylinder, together with knife holding means that presses upon the knives at intermediate portions thereof to deflect the intermediate portions of the edges into contact with the cylindrical surface and thus assure that the ends of the cutting edges are always in firm sliding contact with the cylindrical surface.

Another object is the provision of paired snipping knives of the above character wherein the connection of the yoke with intermediate portions of the knives is nearer to the ends of the knives from which the rotating cylindrical surface departs than to the opposite or approach end of said knives, to balance the frictional drag of the cylinder upon the knife edges wherefor there is no tendency to pivot about the yoke connections and so there is substantially equal pressure against the cylindrical surface at both ends of the knife edges.

Another object is the provision of a universally pivotal connection between an intermediate portion of the yoke of the paired knife assembly and pressure applying means whereby pressure applied from this means against the yoke toward the cylinder will be divided equally between the knives for causing the edges of each to be pressed against the cylindrical surface with the same force.

A further object is the provision of a mounting arm with which the intermediate portion of the knife mounting yoke is pivotally connected, which mounting arm is pivotally mounted at an end remote from the yoke to facilitate swinging of such arm together with the knives axially of the cylinder surface to enable the knives to swing clear of a non-cuttable object, and detent means for normally maintaining the arm in a predetermined desired position axially of the cylindrical surface.

In prior bean snipping machines the mounting means for holding the cutting edges of the knives against the cylinder normally constrain the knives against movement axially of the cylinder. Occasionally a foreign object such as a piece of wire or string has been found caught between the cylinder and a knife mounted in this way. Sometimes a nick is thus caused to be formed in the knife or a groove cut in the surface of the cylinder by this foreign object. Unevenness of knife pressure upon the cylinder by such a stationary knife sometimes causes the cylindrical surface to wear unevenly or the cutting edge of the knife to become dull where cutting occurs. Part of the edge of a stationary knife registers with a portion of the cylinder having openings for the outward projection of bean end portions whereas other parts of the knife register with a portion of the cylinder having no openings. Under these circumstances that portion of the knife registering with the non-perforated section of the cylinder wears away more rapidly to eventually permit the other portion of the knife to drop inwardly where it registers with the cylinder openings to wear grooves in the cylinder. This causes rounding off of the edges of the perforations in the cylinder so that they fail to cooperate in shearing fashion with the knife, and also to cause the cylinder to no longer properly fit non-worn replacement knives. When thus worn the cylinder is capable of no longer properly cooperating with the old knives nor with new knives so that servicing the machine is difficult. One of the objects of this invention is to overcome this disadvantage of prior machines having stationary mounted knives, and this is accomplished by providing mounting means for the knives that cyclically shifts them back and forth axially of the cylinder to distribute the abrasive action of the knives evenly over the entire cylindrical surface. Such back and forth motion of the knives axially of the cylinder is also conducive to dislodgement of any foreign object that may be accidently caught between a knive and the cylinder and to prevent excessive wear of such a foreign object upon the cylindrical surface occurring within a narrow circumferential area thereof that would develop into a deep groove.

The above and other desirable objects inherent in and encompassed by the invention are elucidated in the insuing description, the appended claims and the annexed drawings, wherein:

Fig. 1 is a side elevational view of a bean snipping machine having snipping knife mechanism constructed according to the principles of this invention incorporated into the structure thereof.

Fig. 2 is an enlarged view taken upon the line 2—2 of Fig. 1, to show in side elevation one of the paired snipping knives together with supporting means therefor.

Fig. 3 is also an enlarged view taken upon the line 3—3 of Fig. 2, illustrating both knives of a pair of such knives together with the yoke interconnecting the same and other supporting means for this yoke and the knives.

Fig. 4 is an enlarged sectional view taken on the line 4—4 of Fig. 2, illustrating details of a universally pivotal pressure applying connection between the knife supporting yoke and an arm for applying pressure to the yoke.

Fig. 5 is a sectional view taken on the line 5—5 of Fig. 2 showing mounting means for the arm that applies pressure to the yoke and detent means for yieldably resisting swinging motion of the arm from a position wherein it maintains the knives properly oriented with respect to the cylinder.

Fig. 8 is a diagrammatic view of a knife pair and yoke assembly together with certain axes of the yoke, a plane associated with these axes and other planes respectively associated with the cutting edges of the knives.

Fig. 9 is a fragmentary sectional view taken at the line 9—9 of Fig. 8, transversely of one of the knives to show the tilted relation thereof with respect to the cylinder.

Figure 6:
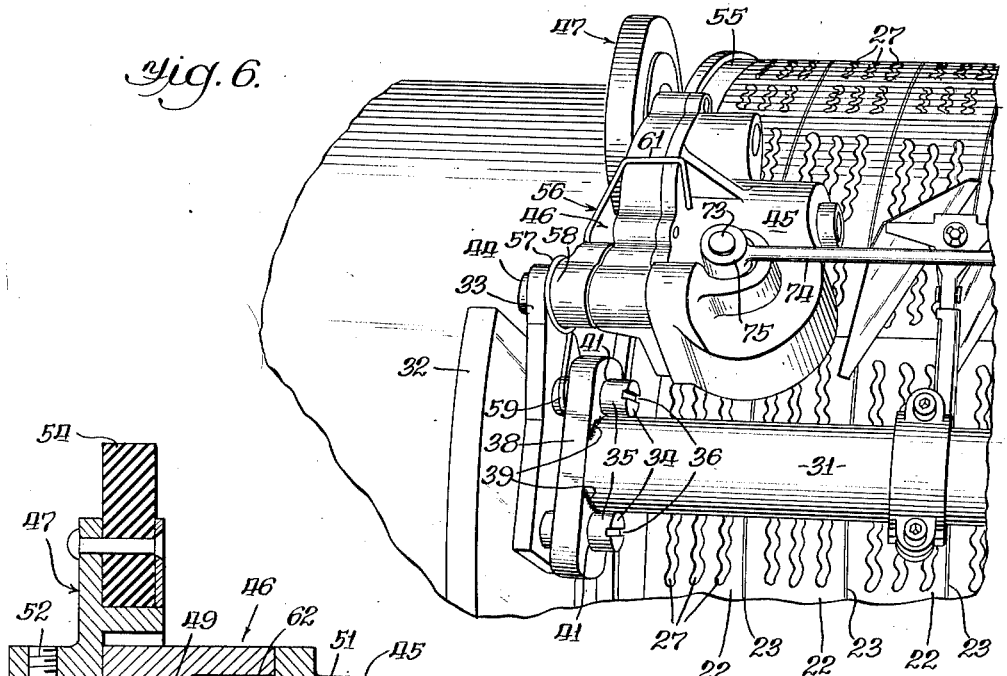
Fig. 6 is a fragmentary perspective view of the cylinder and mechanism driven from the cylinder for imparting slow reciprocating motion to a rod upon which a bank of the paired knives are mounted for reciprocation therewith.

The machine shown in Fig. 1 comprises a frame 10 with a pair of laterally spaced legs 11 at one end and a similar pair of legs 12 at the opopsite end. The legs 11 and 12 nearest the observer conceal the legs respectively paired therewith. A frame member 13 extending longitudinally of the frame 10 is connected with and serves as a brace for the legs 11 and 12. An adjustable footing screw 14 (one being shown) respectively associated with the lower ends of the legs 11 support these legs and the left end of the frame 10 in an elevated position for causing the frame and a large cylinder 15 rotatively carried by the frame to slope downwardly from left to right.

The cylinder 15 is cradled upon rollers (not shown) carried by the frame 10 that are spaced circumferentially of the cylinder and rotatable about axes parallel to the principal or rotational axis of the cylinder whereby this cylinder is adapted to be rotated about its axis without lateral displacement thereof. The supporting rollers for the drum 15 may be of the character illustrated in the above mentioned Patent No. 2,114,730 and are not included in the present disclosure since they form no part of the present invention.

The right end of the cylinder 15 has a large annular sprocket wheel 16 mounted thereon for receiving driving force from a chain 17 which is driven from a sprocket 18 on a driven shaft 19 of a speed reduction unit 20 having an input shaft 21 driven by an electric motor M. The cylinder, which is hollow, has its cylindrical side wall made up of a plurality of curved rectangular plates 22, Figs. 1, 3 and 6. The convex periphery of these rectangular plates 22 is of simple cylindrical curvature corresponding to that of the cylinder 15 compositely formed thereby. Said rectangular plates are arranged in end to end relation within circular rows extending circumferentially of the cylinder 15, and each circular row of these plates is separated from the row or rows adjacent thereto axially of the cylinder by a thin annular plate 23 having a thickness illustrated in Figs. 3 and 6. The plates 22 and the annular spacer plates 23 are held in assembly by a plurality of tie rods (not shown) extending axially of the cylinder 15 as illustrated in said Patent No. 2,114,730, the details of which are unimportant to the present disclosure.

A cylindrical hopper 24 is fixed coaxially with the left or upper end of the cylinder 15 whereas a cylindrical discharge spout 25 is fixed coaxially to the opposite end of the cylinder. String beans (not shown), fed in bulk through a spout 26 into the hopper 24 while the latter is rotating with the cylinder 15, are caused to progress axially into the cylinder 15 and axially through the cylinder while being successively detained in circular pockets (not shown) formed between adjacent of the annular spacer elements 23 which reach radially inwardly from the inner periphery of the cylinder as illustrated in said Patent No. 2,114,730. While in these circular pockets, end portions of some of the beans in each pocket will be caused to project outwardly through serpentine slots or perforations 27 formed in the cylinder-forming plates 22. It is an operating characteristic of a rotating cylinder of this type that the beans from which the ends have been snipped by snipping knives as those designated 28 in sliding contact with the exterior of the cylinder are less impeded by those portions of the annular spacer elements 23 projecting interiorly of the cylinder than are the beans still unsnipped, wherefor the beans which have had their ends snipped are progressed more rapidly through the cylinder and are eventually discharged therefrom through the cylindrical spout 25 onto a carrier belt 29 or other desired receptacle therefor. A high percentage of the beans having ends remaining to be snipped remain in the cylinder until such ends are snipped before progressing into the spout 25 and onto the conveyor belt. This manner of bean progression through the cylinder is illustrated in detail and fully described in said Patent No. 2,114,730.

The present invention relates to the arrangement of the snipping knives 28 in pairs and means for mounting the knives in this fashion and means for cyclically shifting the knives back and forth axially of the cylinder as will now be described. As is visible in Fig. 1 there are two rows of the paired knives 28 spaced circumferentially of the cylinder 15 and extending lengthwise thereof. The cylinder rotates clockwise as viewed from its right end wherefor the periphery of the cylinder against which the knives 28 are in sliding contact is moving upwardly during operation of the machine. Each axial row of the knives 28 constitutes a knife bank and each bank is mounted upon an axially vibratory tubular rod 31 so that as these rods are moved slowly back and forth endwise the knife bank associated therewith will be caused to make axial excursions within a limited range of movement upon the cylinder 15.

The left end of the machine frame 10 has an upwardly extending plate 32 mounted thereon which in turn carries a smaller bracket plate 33. The bracket plate 33 has threaded thereinto a pair of bearing studs 34, Figs. 1 and 6, which have cylindrical bearing portions 35 and screwdriver-bit receiving slots 36 in the accessible ends thereof. A flange member 38 welded to the left end of the uppermost rod 31 at 39 contains bearing openings 41 which receive and are slidable upon the bearing surfaces 35 of the studs 34. A second flange element 38 welded at 39 to the right end of the uppermost rod 31 is slidably mounted upon studs 34' corresponding to the studs 34 and having threaded portions 42 screw threaded into threaded bores 43 of a plate 32' corresponding to the plate 32 and mounted upon the right end of the machine frame 10. Thus the uppermost rod 31 is constrained against rotation by the bearing studs 34 and 34' while being slidable endwise on these studs. A similar mounting is provided for the lowermost rod 31, wherefor the bearing studs therefor and the parts associated therewith are designated by the same respective reference characters as employed for the bearing studs for the upper rod 31 and parts associated therewith.

The uppermost bracket plate 33 Figs. 1 and 6, carries a pivot pin 44 upon which there is pivotally mounted a casing 45 of a power take off and speed reduction unit 46 which derives power from the rotating drum 15 for slowly axially vibrating or reciprocating the uppermost knife bank mounting rod 31.

Figure 7:
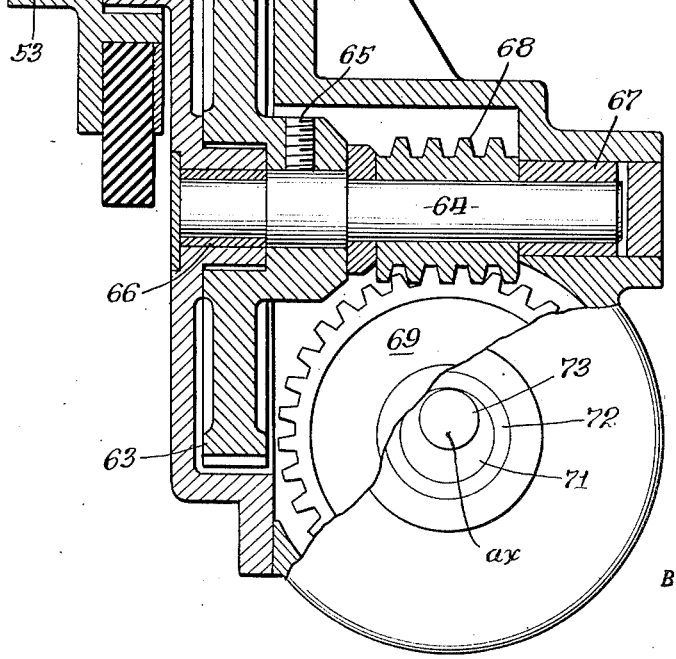
Fig. 7 is an enlarged view taken principally in section through the casing of the mechanism for imparting reciprocating motion to the knife bank mounting rod.

In Fig. 7 a power take off roller 47 of the unit 46 is shown mounted upon a shaft 48 journaled in the casing 45 upon bearing sleeves 49 and 51. Roller 47 and the shaft 48 are constrained for unitary rotation by a set screw 52 in a hub 53 of said roller. A rim portion 54 of the roller 47 is formed of rubber or other suitable elastic material to frictionally engage with the bottom of a circumferential groove 55 extending about the left end of the cylinder 15 so that the roller 47 is caused to rotate and cause rotation of the shaft 48 when the cylinder rotates. A mouse trap spring 56 has a center portion 57 coiled about a hub portion 58 of the casing 45 coaxially with the pivot pin 44, and also has opposite end portions 59 and 61 respectively reacting against the uppermost bearing stud 34 and an upper portion of the casing 45 tending to pivot the casing about the pin 44 in the direction for pressing the roller rim 54 into the cylinder groove 55.

By referring to Fig. 7 it can be seen that the shaft 48 has a gear 62 constrained for rotation therewith and that this gear meshes with and drives a larger gear 63 also disposed within the casing 45 and which is mounted upon a shaft 64 which is constrained for rotation therewith by a set screw 65. Shaft 64 is journaled within casing bearings 66 and 67. A worm pinion 68 is constrained for rotation with the shaft 64 and meshes with and drives a worm gear 69 with which a shaft 71, journaled within a casing bearing 72, is constrained for rotation. An end of the shaft 71 is visible in Fig. 7. A pitman bearing member 73 projects endwise outwardly from the shaft 71 to be swung about the axis of the shaft during rotation thereof. A pitman rod 74 has a bearing 75 at one end mounted upon the pitman bearing 73. The opposite end of this rod 74 is rigidly connected with the uppermost knife bank mounting rod 31 by means of a split collar member 76 grippingly mounted onto said rod. Due to the speed reduction afforded by the gears 62 and 63, the worm pinion 68 and the worm gear 69, the shaft 71 is rotated at less R. P. M. than the cylinder 15, the worm gear 69 being normally rotated at the rate of approximately one revolution per minute whereby the knife bank mounting rod 31 and the snipping knives 28 associated therewith are caused to complete one cycle of reciprocation axially of the cylinder each minute. A U-section 77 forming an intermediate portion of the pitman rod 74 is adapted to yield to avoid injury to any of the reciprocating parts and also to the power take off and speed reduction 46 in the event of any of the reciprocating parts catching upon a foreign object resisting movement thereof. The lower knife bank supporting rod 31 is driven reciprocally by a power-take-off speed reduction unit and pitman rod identical with those described above and therefore indicated by the same respective reference characters in Fig. 1.

Each of the snipping knives 28 comprises a thin resilient elongated body 78 having a broad inner face 79 and an opposite broad outer face 81; see Figs. 2 and 3. These knives are lengthwise bowed whereby the inner face 79 is concave and the outer face 81 is convex. Each knife body 78 has a cutting edge 82 coinciding with one of the long edges thereof and curved to conform to the curvature of such bowed body.

The knives 28 of each pair are mounted upon a supporting yoke 83 therefor. Each yoke is provided with knife attaching portions 84 and 85 to which the knife bodies 78 are rigidly secured by rivets 86. Since all of the paired knives and supports therefor are the same, attention can be confined to the details of Figs. 2 through 5 where it can be seen in Fig. 4 that an intermediate portion of the yoke 83 contains a hole 87, and is bulged to provide a substantially semi-spherical bearing surface 88 immediately about said hole. A short anchorage stud 89 fits snugly within the hole 87 where it is welded in place by an annular weld 91 disposed within the cavity of the bulged portion of the yoke. Anchorage stud 89 projects through an opening 92, of slightly greater diameter than this stud, formed within a leaf spring arm 93 having its lower end pivotally mounted upon the shank 94 of a cap screw 95; see Fig. 2. A washer 96, Figs. 2 and 4, is placed on the anchorage stud 89 behind the arm 93, and this washer and the arm 93 are held assembled upon the stud 89 by a split-wafer key 98 snapped into position with a circumferential groove 99 within the stud. Inasmuch as the hole 92 in the spring arm 93 is oversize with respect to the anchorage stud 89 and the combined thickness of the arm 93 and the washer 96 does not fill the space between the semi-spherical bearing surface 88 of the yoke 83 and the split-wafer key 98, the yoke 83 and the anchorage stud 89 rigidly secured thereto can pivot universally relatively to the arm 93 while that portion of the arm 93 immediately about the opening 92 therein bears against and slides upon the semi-spherical surface 88. Thus a universally pivotable joint 101 exists between the yoke 83 and the leaf spring arm 93. An axis a—a coaxial with the stud 89 constitutes an anchorage axis for the yoke 83 and about which this yoke is capable of universal nutating motion relatively to the spring arm 93. Rotational movement of the yoke 83 about the anchorage axis a—a is limited by a pair of lugs 102 and 103, Figs. 2 and 3, formed upon the lower end of a stem-like extension 104 of said yoke and which straddle said arm.

Each of the leaf spring arms 93 is associated with a bracket 105 having a split hub 106 surrounding and clamped onto a section of one of the knife bank mounting rods 31; see Figs. 1, 2, 3 and 5. A pair of recess headed screws 107 are used to clamp each of the split hubs 106 onto the knife bank mounting rod 31. Each bracket 105 has a vertical flat face 108 against which the lower flat end 109 of a spring arm 93 is pressed by a flange 111 of the associated cap screw 95, thereby placing a stress in that portion of the spring arm 93 extending upwardly therefrom for urging a twist-section 112 of this arm into a V-notch 113 within an edge of a head 114 upon the upper end of the bracket 105, see Figs. 2 and 5. When the twist sections 112 of the leaf spring arms 93 are disposed within the bracket notches 113, the arms 93 will be aligned in an upright direction with their brackets 105 as shown in Figs. 1 and 3. Should, however, a non-cuttable article projecting outwardly through a cylinder opening 27 be carried against one of the knife edges 82, the greater force thus imposed upon the knife would urge the arm 93 counter-clockwise, Fig. 3, about the axis of the cap screw shank 94 with sufficient force to slide the shank twist section 112 along the notch face 115 and outwardly of the notch pursuant to the arm 93 and the parts carried thereby swinging from the full line position of Fig. 3 to the position shown by dot-dash lines. In this dot-dash line position the knives 28 will be swung far enough to one side to avoid further contact therewith by the non-cuttable foreign object. After the machine has been cleared of the non-cuttable foreign object the spring arm 93 and parts carried thereby can be manually replaced into the normal position shown by full lines in Figs. 2, 3 and 5. The biased character of the spring arm 93 pressing the twist section 112 thereof into the bracket notch 113 together with this notch and the twist section disposed therein consitute a form of detent means for yieldably retaining the arm 93 and the knives 28 in the desired position of orientation with respect to the cylinder 15.

The radius of curvature of the cutting edge 82 for each of the bowed flexible knives 28 when allowed to assume its normal shape is slightly less than the radius of curvature of the exterior periphery of the cylinder 15. This difference in radius of cuvature of the knife cutting edges and cylinder is very slight, however, so that by the pressure applied to these knives through the brackets 83 toward the cylinder can flex the knife bodies sufficiently to cause the cutting edges 82 to conform throughout their length to the cylinder surface. The amount of pressure applied through the brackets 83 for pressing the cutting edges of the knives against the surface of the cylinder 15 is regulatable by adjusting the rotative position of the brackets 105 on their knife bank carrying rod 31. In Fig. 2 it can be seen that while the screws 107 are loosened the bracket 105 can be adjusted counter-clockwise about the axis x—x (shown as a point) of the tubular rod 31 to place the proper amount of tension in the spring arm 93 for pressing the knives against the cylinder 15. The proper adjustment is maintained by tightening the screws 107.

Because of the pressure of the knife edges 82 against the cylinder 15, there is significant wearing away of the bevelled knife edges which keeps them sharp. Evenness of sharpness is assured by the cyclical sliding of the knives axially of the cylinder 15 by the endwise oscillating rods 31 of which the movement is about equal to the breadth of the serpentine slots 27 so sections of the knife edges alternately register with the slots for cutting the product and then rub against the cylinder surface between the axially spaced slots to sharpen the knives while wearing them and the cylinder surface evenly.

Attention is now invited to Fig. 8 where orientation with respect to the cylinder 15 is illustrated for the frame like structure formed by a pair of the knives 28 and the yoke 83 associated therewith. In addition to the anchorage axis a—a for the yoke illustrated in Figs. 4 and 8, this yoke also has a median axis b—b extending crosswise thereof. These two intersecting axis a—a and b—b are common to a plane ABCD. The cutting edge 82 of the leftmost knife 28 coincides with a plane EFGH which is parallel with a plane E'F'G'H' coinciding with the cutting edge 82 of the rightmost knife 28, and which planes EFGH and E'F'G'H' are also parallel with the yoke anchorage axis a—a but diagonal with respect to the plane ABCD. It will also be noted that the convex face on the body of the rightmost knife 28 is tranversely inclined relatively to the plane E'F'G'H' at an acute included angle X', and that the body of the leftmost knife 28 is transversely inclined relatively to the plane EFGH at an angle X equal to the angle X'. The rake angle R between one of the knife bodies 78 and the outer periphery of the cylinder is shown in Fig. 9.

In Figs. 2 and 3 it can be observed that the rivets 86 connecting the yoke attaching portions 85 to the knives 28 are nearer to the upper ends of these knives than to the lower ends thereof. Since the cutting edges 82 of the knives 28 extend diagonally or spirally of the cylinder 15, and since this cylinder rotates in the direction to carry the portion thereof engaging the knife edges upwardly with respect thereto within a line of movement perpendicular to the cylinder axis, that portion of a cutting edge 82 between the left end thereof and a point Z on the line P—P' (note the rightmost knife in Fig. 3) will receive a component of force from the frictional drag of the drum thereon tending to pivot the knife 28 clockwise about the point P, whereas that portion of the knife edge 82 between the upper end thereof and the point Z will receive a frictional drag component of force from the cylinder tending to rotate the knife counter-clockwise about the point P. By attaching the rivets 86 to the knives 28 nearer their upper ends than to their lower ends, the knife edge length between point Z and the lower end of the knife more nearly equals the length of that part of the knife edge between the point Z and the upper end of the knife than if the rivets were attached midway between the ends of the knife. With this arrangement the clockwise cylinder drag on that portion of the knife edge below point Z more nearly balances the cylinder drag in the counter-clockwise direction than the knife edge portion above the point Z. Therefore the frictional drag upon the knives is sufficiently balanced, during cylinder rotation, as to not disturb the setting thereof with the entire cutting edge length in pressure engagement with the cylinder surface while the cylinder is at rest.

Having thus described a single preferred embodiment of the invention with the view of clearly and concisely illustrating the same, I claim:

1. In a knife mechanism for snipping stem portions projecting outwardly through openings in a cylindrical surface with which such stem portions are moveable pursuant to rotation thereof about its principal axis, a knife supporting yoke having end portions spaced apart axially of such cylindrical surface and disposed radially outwardly therefrom, a pair of knives each comprising an elongated resilient body that is concavo-convex in a lengthwise direction thereof, each knife body being secured at an intermediate portion thereof with a respective end portion of the yoke and with the concave faces of such bodies disposed toward the cylindrical surface, said knives having respective curved cutting edges coinciding with long edges thereof toward which portions of the cylindrical surface approach during rotation of such surface and extending in parallelism diagonally of the cylindrical surface axis, the curvature of said cutting edges substantially conforming to the portion of the cylindrical surface with which they are contiguous, the knives also having edges upon said bodies thereof oppositely from said cutting edges, said knife bodies extending transversely from their cutting edges divergingly outwardly from the cylindrical surface to said opposite edges which are thus spaced more distantly from said cylindrical surface than the cutting edges, and means for holding said yoke against rotation with the cylindrical surface and for exerting a pressure on an intermediate portion thereof radially inwardly of said cylindrical surface to press the knife cutting edges thereagainst while flexing the concavo-convex knife bodies.

2. In a stem snipping knife mechanism, a knife supporting yoke having a median axis and opposite end portions on opposite sides of such axis, a pair of stem snipping knives each comprising a thin resilient elongated body having an inner concave face and an opposite convex face of which faces both are curved lengthwise of the body, each knife body having a cutting edge coinciding with a long edge thereof and curved to conform with the curvature of such body, said knife bodies having intermediate portions respectively connected with the end portions of said yoke for maintaining the cutting edges substantially within parallel planes extending diagonally of the yoke axis, and said knife bodies being transversely inclined with respect to said planes to form an included acute angle therewith.

3. In a stem snipping knife mechanism, a knife supporting yoke having a median axis and an anchorage axis intersecting the median axis substantially perpendicularly thereto and disposed within a plane common thereto, said yoke also having spaced-apart knife attaching portions on opposite sides of said plane, a pair of stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform with the curvature of such bowed body, said knife bodies being respectively mounted upon said knife attaching portions of the yoke for disposing the cutting edges substantially within respective parallel planes which are also parallel with said anchorage axis but diagonal with respect to the plane common to said axes, and each of said knife bodies being transversely inclined in the same direction relatively to their respectively associated parallel planes to form an included acute angle between the convex face thereof and the parallel plane associated therewith.

4. In a stem snipping knife mechanism, a knife supporting yoke having a median axis and an anchorage axis intersecting the median axis substantially perpendicularly thereto and disposed within a plane common thereto, said yoke also having spaced-apart knife attaching portions on opposite sides of said plane, a pair of stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform with the curvature of such bowed body, said knife bodies being respectively mounted upon said knife attaching portions of the yoke for disposing the cutting edges substantially within respective planes which are parallel with said anchorage axis but diagonal with respect to the plane common to said axes, and each of said knife bodies being transversely inclined to the planes respectively associated therewith to form an included acute angle between the convex face thereof and the plane associated therewith.

5. In a stem snipping knife mechanism, a knife supporting yoke having a median axis and an anchorage axis intersecting the median axis substantially perpendicularly thereto and disposed within a plane common thereto, said yoke also having spaced-apart knife attaching portions on opposite sides of said plane, a pair of stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform with the curvature of such bowed body, said knife bodies being respectively mounted upon said knife attaching portions of the yoke for disposing the cutting edges substantially within respective parallel planes which are also parallel with said anchorage axis but diagonal with respect to the plane common to said axes, a yoke supporting arm, universal joint means medially intersected by said anchorage axis and operable to connect the yoke with said arm, and means restraining the yoke to limited oscillative pivotal movement about the anchorage axis relatively to the arm.

6. In a stem snipping knife mechanism, a knife supporting yoke having a median axis and an anchorage axis intersecting the median axis substantially perpendicularly thereto and disposed within a plane common thereto, said yoke also having spaced-apart knife attaching portions on opposite sides of said plane, a pair of stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform with the curvature of such bowed body, said knife bodies being respectively mounted upon said knife attaching portions of the yoke for disposing the cutting edges substantially within respective parallel planes which are also parallel with said anchorage axis but diagonal with respect to the plane common to said axes, said yoke having a semi-spherical bearing surface coaxial with said anchorage axis, an anchorage stud also coaxial with said anchorage axis and projecting radially outwardly from the semi-spherical bearing surface, a leaf spring yoke-supporting arm having a hole in an end portion thereof slightly oversize in diameter with respect to the bearing stud, the bearing stud being projected through said opening to place an annular portion of the arm circumscribing the hole into engagement with the spherical bearing surface, and a means on the bearing stud on the opposite side of the arm with respect to the bearing surface to maintain said arm and bearing surface in contiguity.

7. The combination set forth in claim 6, wherein there are lug means on said yoke straddling the spring arm for butting against respectively opposite edges thereof for limiting pivotal movement of the yoke relatively to the arm about the anchorage axis.

8. In a stem snipping knife mechanism, a knife supporting yoke having a median axis and an anchorage axis intersecting the median axis substantially perpendicularly thereto and disposed within a plane common thereto, said yoke also having spaced-apart knife attaching portions on opposite sides of said plane, a pair of stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform with the curvature of such bowed body, said knife bodies being respectively mounted upon said knife attaching portions of the yoke for disposing the cutting edges substantially within respective parallel planes which are also parallel with said anchorage axis but diagonal with respect to the plane common to said axes, an arm supporting bracket, a yoke supporting arm, means pivotally connecting an end of the arm with said bracket for swinging movement relatively thereto from a knife activating position to a knife inactivating position, joint means intersected by said anchorage axis and connecting said yoke to the other end of said arm to facilitate nutating movement of the yoke relatively to the arm, and detent means for releaseably holding the arm in the knife activating position relatively to the bracket.

9. In a stem snipping knife mechanism, a knife supporting yoke having a median axis and an anchorage axis intersecting the median axis substantially perpendicularly thereto and disposed within a plane common thereto, said yoke also having spaced-apart knife attaching portions on opposite sides of said plane, a pair of stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform with the curvature of such bowed body, said knife bodies being respectively mounted upon said knife attaching portions of the yoke for disposing the cutting edges substantially within respective parallel planes which are also parallel with said anchorage axis but diagonal with respect to the plane common to said axes, an arm supporting bracket, a leaf spring yoke-supporting arm, means pivotally connecting an end of said arm with said bracket for swinging motion relatively thereto from a knife activating position to a knife inactivating position, joint means intersected by said anchorage axis and pivotally mounting the yoke upon the opposite end of the leaf spring arm to facilitate nutating movement of the yoke relatively to the arm, a notched section in the bracket contiguous with an intermediate section of said arm, said intermediate section of the arm constituting a twist section thereof disposed within the bracket section notch when the arm is in the knife activating position, and the arm being elastically yieldable responsively to a force urging the same from the knife activating position toward the knife inactivating position to facilitate sliding of the twist section from said notch to release the arm and accommodate swinging thereof with the yoke and knives into the knife inactivated position.

10. In a bean snipping machine, a frame, a bean holding cylinder journaled in said frame for rotation about its principal axis and comprising a cylindrical side wall having openings therein through which end portions of beans within the cylinder can project outwardly, a knife bank supporting rod extending axially of the cylindrical wall exteriorly thereof, bearing means mounting said rod upon the frame to accommodate endwise reciprocation of such rod, a plurality of yoke supporting arms, means mounting end portions of the arms upon said rod in spaced-apart relation axially thereof and to project such arms transversely of the rod alongside the exterior of the cylinder, knife supporting yokes each having a median axis extending tangentially of the cylinder and an anchorage axis intersecting the median axis substantially perpendicularly thereto and disposed within a plane common to such axes, said anchorage axis also being substantially radial with respect to the cylinder, each yoke also having spaced-apart knife attaching portions on opposite sides of the plane common to its axes, a plurality of joint means respectively intersected by said anchorage axis and pivotally mounting said yokes respectively upon the opposite ends of said arms to facilitate nutating movement of the yokes relatively to the arms, stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform to the curvature of such bowed body, said knife bodies being respectively mounted upon the knife attaching portions of the yokes and disposed with their concave faces toward but at a rake angle with respect to the outer periphery of the cylinder wall and their cutting edges in engagement with such wall periphery along respective lines extending substantially spirally of the cylinder, and means operable for reciprocating said knife bank mounting rod to slide the knives axially of the cylinder in timed relation with rotation thereof.

11. In a bean snipping machine, a frame, a bean holding cylinder journaled in said frame for rotation about its principal axis and comprising a cylindrical side wall having openings therein through which end portions of beans within the cylinder can project outwardly, a knife bank supporting rod extending axially of the cylindrical wall exteriorly thereof, bearing means mounting said rod upon the frame to accommodate endwise reciprocation of such rod, a plurality of yoke supporting spring arms, means mounting end portions of the arms upon said rod in spaced-apart relation axially thereof and to project such arms transversely of the rod and of the cylinder to place opposite end portions of the arms alongside the exterior of the cylinder, knife supporting yokes extending lengthwise of the cylinder and respectively crosswise of the opposite end portions of said arms, the ends of said yokes constituting knife attaching portions, means for mounting said yokes upon the end portions of the arms with which they are associated, stem snipping knives each comprising a thin resilient elongated body having opposite inner and outer broad faces and lengthwise bowed whereby the inner face is concave and the outer face convex, each knife body having a cutting edge coinciding with a long edge thereof and curved to conform to the curvature of such bowed body, said knife bodies being respectively mounted upon the knife attaching portions of the yokes and disposed with their concave faces toward but at a rake angle with respect to the outer periphery of the cylinder wall and their cutting edges in engagement with such wall periphery along respective lines extending substantially spirally of the cylinder, and means drivable from the cylinder when the latter is rotated to reciprocate said knife bank mounting rod for sliding the knives axially of the cylinder in timed relation with rotation thereof.

12. The combination set forth in claim 11 wherein the means drivable from the cylinder comprises a power take off and speed reduction unit including a casing, a power input shaft journaled in said casing for rotation about an axis parallel with the cylinder axis, a friction roller mounted on the input shaft for rotation therewith, a power take off shaft journaled in the casing for rotation about an axis adjacent to and perpendicular to the knife bank supporting rod, a pitman bearing on the output shaft eccentric with respect to the axis of said shaft, power transmission means within the casing for driving the output shaft from the input shaft at a reduced speed with respect thereto, means pressing the friction roller into engagement with a peripheral portion of the cylinder for transmitting drive to the roller from the cylinder when the latter is rotating, a pitman rod having an end journaled upon the pitman bearing, and means connecting the opposite end of the pitman rod with the knife bank supporting rod for reciprocating the latter.

13. The combination set forth in claim 12, wherein the pitman rod has a U-shaped intermediate spring section to facilitate variation in the axial spacing of the two ends of such rod.

14. The combination set forth in claim 11, wherein means drivable from the cylinder comprises a power take off and speed reduction unit including a casing, means pivotally connecting the casing with said frame for pivotal movement about an axis substantially parallel with the cylinder axis, a power input shaft journaled in said casing for rotation about an axis also substantially parallel with the cylinder axis, a friction roller mounted on the input shaft for rotation therewith, spring means resiliently urging the casing to pivot about the axis of the frame mounting means therefor to press the friction roller against an exterior peripheral portion of the cylinder to cause said roller and input shaft to receive driving force from the cylinder, a power take off shaft journaled in the casing for rotation about an axis perpendicular to the knife bank supporting rod, a pitman bearing on the output shaft eccentric with respect to the axis of such shaft, power transmission means within the casing for driving the output shaft from the input shaft at a reduced speed with respect thereto, a pitman rod having an end journaled upon the pitman bearing, and means connecting the opposite end of the pitman rod with the knife bank supporting rod for reciprocating the latter pursuant to rotation of the power take off shaft.

References Cited in the file of this patent

UNITED STATES PATENTS

| | | |
|---|---|---|
| 1,765,952 | Urschel | June 24, 1930 |
| 2,114,730 | Urschel | Apr. 19, 1938 |
| 2,376,062 | Kerr | May 15, 1945 |
| 2,393,461 | Finley | Jan. 22, 1946 |